No. 777,718. PATENTED DEC. 20, 1904.
J. D. DOBELMAN.
PUNCTURE PROOF COVER FOR PNEUMATIC TIRES.
APPLICATION FILED APR. 29, 1904.
NO MODEL.
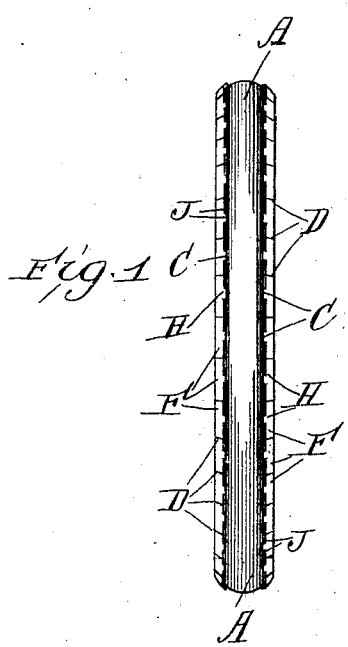
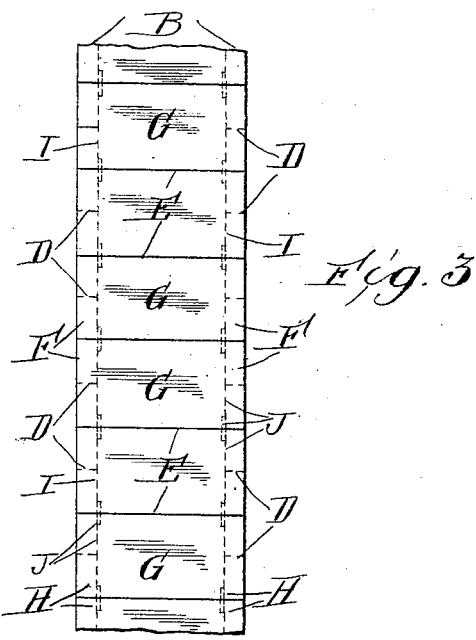
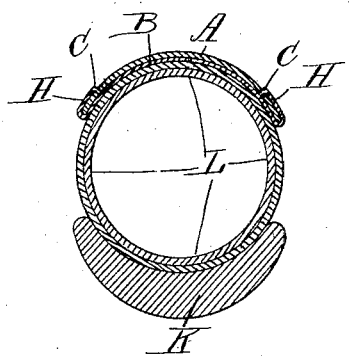
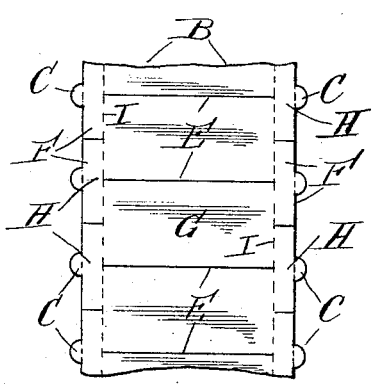
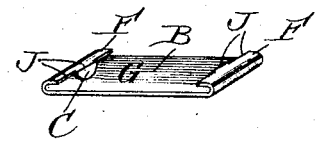

No. 777,718. Patented December 20, 1904.

UNITED STATES PATENT OFFICE.

JOHN D. DOBELMAN, OF CHICAGO, ILLINOIS.

PUNCTURE-PROOF COVER FOR PNEUMATIC TIRES.

SPECIFICATION forming part of Letters Patent No. 777,718, dated December 20, 1904.

Application filed April 29, 1904. Serial No. 205,518.

*To all whom it may concern:*

Be it known that I, JOHN D. DOBELMAN, a citizen of the United States, whose residence and post-office address is at No. 7005 Throop street, in the city of Chicago, county of Cook, and State of Illinois, have invented a new and useful Improvement in Puncture-Proof Covers for Pneumatic Tires, of which the following is a specification.

The object of my invention is to provide a puncture-proof cover for pneumatic tires for bicycles, motor-cars, and other vehicles, so as to protect the tire from contact with the roadway to prevent the cutting or piercing of the tire— a cover which is easily placed on the tire and which will not materially reduce the resiliency of the tire on which the cover is placed. I accomplish these objects as described in the following specification and illustrated in the accompanying drawings, in which—

Figure 1 is a vertical view of my improved pneumatic-tire cover, showing the overlapping margins of the metallic lining of the cover. Fig. 2 is a cross-sectional view of the rim of a wheel, a tire, and of my improved cover. Fig. 3 is an inside view of the metallic lining attached to the cover. Fig. 4 is a view of the metallic lining, showing the form and the partial separation of the metal into sectional parts before it is made part of the cover. Fig. 5 is a perspective view of a part of the lining, showing the method of attachment of the lining to the cover and complete separation of the lining into individual parts.

Similar letters indicate similar parts in the several views.

The cover A is made of any suitable material, preferably rubber, and of suitable shape and size to fit the particular tire it is designed to fit. On the inside of this cover and overlapping the edges is a metallic band B. Before this band is affixed to the cover A it is cut into the shape shown in Fig. 4, the margin being so cut as to leave a series of ears C, by which the band is made fast to the cover. Between these ears the margin is cut through, as indicated by the lines D, and the body of the band is cut through from margin to margin, as indicated by the lines E. The band is thus partially separated into sections F and G, of any suitable width between the said lines necessary to secure the required flexibility of the cover. The metal band being thus formed and divided is placed inside the cover, and the margins H are lapped over the edges of the cover, the bend being made along the dotted lines I, Fig. 4. Before the margins are folded down the ears C are bent inward and are pressed into and through the cover, as shown in Figs. 2 and 5. The edge of the margins when fully pressed down on the cover forms slightly irregular lines J on the cover, as shown in Fig. 1 and by the dotted lines J in Fig. 3.

The cover thus constructed is ready for use. To place it on the tire L, the tire must be partly or wholly free from air-pressure and is inflated. When the cover is in place, the pressure of the inflated tire on the rim K and on the cover A holds the cover firmly in place while in use, the sectional divisions of the metal band yielding to the pressure from without and from within. The metallic lining may also be formed of independent sections similar to the form shown in Fig. 5.

What I claim, and desire to secure by Letters Patent, is—

1. A removable cover for pneumatic tires comprising the combination of the cover A, preferably of rubber, and a metallic lining B, said lining having a series of ears C and being divided into marginal sections F and main sections G, the margins H being folded over the edges, and the ears C being driven into, and made fast in the cover A, substantially as described and for the purposes specified.

2. A removable cover for pneumatic tires comprising the combination of a cover A of any suitable material, and a metallic lining B, the said lining being divided into marginal sections F and main sections G, the margins H being folded over the edges of the cover A and made fast thereto, substantially as described and for the purposes specified.

3. A removable cover for pneumatic tires comprising the combination of a cover A and a metallic lining B, said lining being partly separated into a series of semi-independent divisions both in the margins H and in the main body G, the margins H being folded over the edges of the cover A and made fast thereto by any suitable means, substantially as described and for the purposes specified.

4. A cover for pneumatic tires comprising a cover A and a metallic lining B, said lining being partly separated into semi-independent divisions, part of said lining being folded over the edges of said cover and made fast thereto, substantially as described and for the purposes specified.

JOHN D. DOBELMAN.

Witnesses:
JULIUS RUBINSTEIN,
JOSEPH STAAB.